United States Patent
Nishimura et al.

(10) Patent No.: US 7,647,689 B2
(45) Date of Patent: Jan. 19, 2010

(54) METHOD OF MANUFACTURING STATOR OF ROTATING ELECTRIC MACHINE

(75) Inventors: Yasukazu Nishimura, Tokyo (JP);
Yoshihiro Harada, Tokyo (JP);
Yoshinori Kanazawa, Tokyo (JP);
Yutaka Hirota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 295 days.

(21) Appl. No.: 11/362,843

(22) Filed: Feb. 28, 2006

(65) Prior Publication Data

US 2007/0022596 A1    Feb. 1, 2007

(30) Foreign Application Priority Data

Jul. 28, 2005   (JP) .............................. 2005-218106

(51) Int. Cl.
*H02K 15/00* (2006.01)
(52) U.S. Cl. .............................. 29/596; 29/605; 29/606; 29/732; 72/295; 72/481.5; 310/179; 310/184
(58) Field of Classification Search ................ 29/596, 29/605, 606, 732; 72/295, 481.5; 310/179, 310/184
See application file for complete search history.

(56) References Cited

U.S. PATENT DOCUMENTS

| | | | |
|---|---|---|---|
| 5,613,529 | A | 3/1997 | Tanaka et al. |
| 6,376,961 | B2 | 4/2002 | Murakami et al. |
| 6,717,317 | B2 | 4/2004 | Akita et al. |

FOREIGN PATENT DOCUMENTS

| | | |
|---|---|---|
| JP | 2002-176752 A | 6/2002 |
| JP | 2002-315246 A | 10/2002 |
| JP | 33327716 B2 | 12/2002 |
| JP | 2004-135438 A | 4/2004 |

*Primary Examiner*—Thiem Phan
(74) *Attorney, Agent, or Firm*—Sughrue Mion, PLLC (57) ABSTRACT

A method of manufacturing a stator of a rotating electric machine includes a conductor end shaping process for shaping multiple lead wires aligned side by side in a single layer into a specific form in a plane in which the lead wires are initially aligned before a flat-patterned winding assembly configured by aligning multiple line conductors side by side and shaping the line conductors in spiral form is fitted into multiple slots formed in a flat stator core plate. The shaping process includes the steps of shaping the lead wires into bent form by using a stairstep conductor shaping jig under conditions where the lead wires are separated from one another along a direction generally perpendicular to the plane in which the lead wires are initially aligned, and causing the lead wires to return to positions in the initial alignment plane thereof by removing the stairstep conductor shaping jig.

4 Claims, 12 Drawing Sheets

METHOD OF MANUFACTURING STATOR OF ROTATING ELECTRIC MACHINE

CROSS REFERENCE TO RELATED DOCUMENT

This application claims priority to Japanese Patent Application No. JP2005-218106, filed on Jul. 28, 2005.

BACKGROUND OF THE INVENTION

1. Field of the Invention

The present invention relates to a method of manufacturing a stator of a rotating electric machine, such as an alternating current (AC) generator, for installation onboard a vehicle. More particularly, the invention is concerned with shaping of end portions of stator windings.

2. Description of the Background Art

There is a growing need today for compact, high-power rotating electric machines, such as AC generators for vehicles. In particular, it is desired to lay electrical conductors in a magnetic circuit of a stator with an increased space factor and to neatly shape and arrange coil end portions of stator windings at a higher density.

A previous approach to meeting these requirements is found in Japanese Patent Application Publication No. 2002-176752 (corresponding to U.S. Pat. No. 6,376,961 to Murakami et al), for example, in which stator windings are configured by combining a plurality of winding assemblies each of which is formed by bending multiple strip conductor elements together in order to produce a stator in compact size.

Another previous approach is a coil shaping method disclosed in Japanese Patent Application Publication No. 2004-135438, in which end portions of multiple coil elements projecting from successive slots formed in an annular pattern in a rotor (or stator) are fitted into recesses of a twisting jig and bent at the same time.

Still another previous approach is a conductor end shaping method for forming end portions of multiple stator coils of a rotating electric machine that is shown in Japanese Patent Application Publication No. 1996-205487. In the conductor end shaping method of this approach, a plurality of coil end portions extending from a stator in an annular pattern are sandwiched by a pair of flat or circular opposed shaping members and are formed into a specific shape by application of a mechanical force by means of a movable pressing member.

According to the approach of Japanese Patent Application Publication No. 2002-176752 in which multiple strip conductor elements aligned side by side are shaped into coils, end portions of the multiple strip conductor elements, or line conductors, are shaped to configure terminal leads for connection to specific other conductors. If the end portions of the line conductors are shaped together simultaneously in a plane in which the conductor end portions are parallel-aligned close to one another, the individual conductor end portions will be damaged by mutual friction depending on the direction of bending. It is particularly difficult to avoid damage to the line conductors when the end portions thereof are to be shaped into bent form in a plane which does not make any angle with the plane in which the end portions are parallel-aligned, or in the same plane as the line conductor alignment plane. Although the multiple conductor end portions might be individually bent, and not all together, to prevent damaging, it is inefficient and time-consuming to individually shape a large number of line conductors.

According to the coil shaping method of Japanese Patent Application Publication No. 2004-135438, straight portions of the individual coil elements are placed in the slots formed in the rotor (or stator) and the end portions of the coil elements are bent with a twist at points where the coil elements just stick out of the slots. In this coil shaping method, cuffs are fitted between the coil elements arranged side by side and the large number of coil elements are twisted all together. This method requires extra processes related to the cuffs, including insertion thereof, and complex operation performed by using a complicated twisting jig having a large number of positioning parts tightly arranged side by side for twisting the parallel-aligned coil elements.

According to the conductor end shaping method of Japanese Patent Application Publication No. 1996-205487, the multiple coil end portions are sandwiched by the two facing shaping members which are made movable, and then shaped and gathered together. It is therefore inevitable to avoid mutual friction of individual conductors.

SUMMARY OF THE INVENTION

The present invention is intended to solve the aforementioned problems of the prior art. Accordingly, it is an object of the invention to provide a method of shaping end portions of a plurality of line conductors into bent form. It is a more specific object of the invention to provide a method of shaping conductor end portions into bent form in a plane in which the conductor end portions lie in a parallel-aligned state without causing damage to the line conductors.

In one aspect of the invention, a method of manufacturing a stator of a rotating electric machine includes aligning a plurality of strip line conductors side by side and shaping the line conductors in spiral form to configure a flat-patterned winding assembly, fitting the flat-patterned winding assembly into multiple slots formed in a flat stator core plate and shaping the stator core plate into cylindrical form together with the winding assembly fitted in the slots. This stator manufacturing method includes a conductor end shaping process for shaping a plurality of lead wires which are end portions of the multiple line conductors aligned side by side in a single layer into a specific form in a plane in which the lead wires are initially aligned before fitting the flat-patterned winding assembly into the multiple slots. The aforementioned conductor end shaping process includes the steps of shaping the plurality of lead wires into bent form under conditions where the lead wires are separated from one another along a direction generally perpendicular to the plane in which the lead wires are initially aligned, and causing the plurality of lead wires to return to positions in the initial alignment plane of the lead wires.

In this stator manufacturing method, the conductor end shaping process is performed before the flat-patterned winding assembly is fitted into the slots formed in the flat stator core plate. This makes it possible to provide adequate work space for shaping the lead wires and achieve improved working efficiency and reliability. In this conductor end shaping process, the multiple lead wires are shaped into bent form under conditions where the lead wires are separated from one another along the direction generally perpendicular to the plane in which the lead wires are initially aligned and, then, the lead wires are returned to the positions in the initial alignment plane of the lead wires. Thus, the multiple lead wires can be easily bent without damaging each other. This makes it possible to shape the multiple lead wires all together into bent form with ease and high reliability. Also, the conveniently arranged multiple lead wires can be easily shaped into bent form in a short time with high reliability.

In another aspect of the invention, a method of manufacturing a stator of a rotating electric machine includes aligning a plurality of strip line conductors side by side and shaping the line conductors in spiral form to configure a flat-patterned winding assembly, fitting the flat-patterned winding assembly into multiple slots formed in a flat stator core plate and shaping the stator core plate into cylindrical form together with the winding assembly fitted in the slots. This stator manufacturing method includes a conductor end shaping process for shaping a plurality of lead wires which are end portions of the multiple line conductors aligned side by side in a single layer into a specific form in a plane in which the lead wires are initially aligned before fitting the flat-patterned winding assembly into the multiple slots. The aforementioned conductor end shaping process includes temporarily shaping the multiple line conductors by twisting the same at respective shaping starting points each of which is chosen at a specific location within a line conductor portion to be fitted into one of the slots that connects to one of the lead wires such that the plurality of lead wires align side by side in a plane intersecting the plane in which the lead wires are initially aligned at a specific angle, shaping the plurality of lead wires which are parallel-aligned in the plane intersecting the initial alignment plane into a specific bent form, and causing the plurality of lead wires to return to positions in the initial alignment plane by untwisting action of the line conductors about the respective shaping starting points.

In this stator manufacturing method, the conductor end shaping process is performed before the flat-patterned winding assembly is fitted into the slots formed in the flat stator core plate. This makes it possible to provide adequate work space for shaping the lead wires and achieve improved working efficiency and reliability. In this conductor end shaping process, the multiple line conductors are temporarily shaped by twisting the same at respective shaping starting points each of which is chosen at a specific location within a line conductor portion that connects to one of the lead wires, the multiple lead wires are shaped into the specific bent form and, then, the lead wires are returned to the positions in the plane in which the lead wires are initially aligned by untwisting action of the line conductors. Thus, the multiple lead wires can be easily bent without damaging each other. This makes it possible to shape the multiple lead wires all together into bent form with ease and high reliability. Also, the conveniently arranged multiple lead wires can be easily shaped into bent form in a short time with high reliability.

These and other objects, features and advantages of the invention will become more apparent upon reading the following detailed description in conjunction with the accompanying drawings.

DESCRIPTION OF THE PREFERRED EMBODIMENTS

Specific embodiments of the present invention are now described with reference to the accompanying drawings.

First Embodiment

Figure 1:
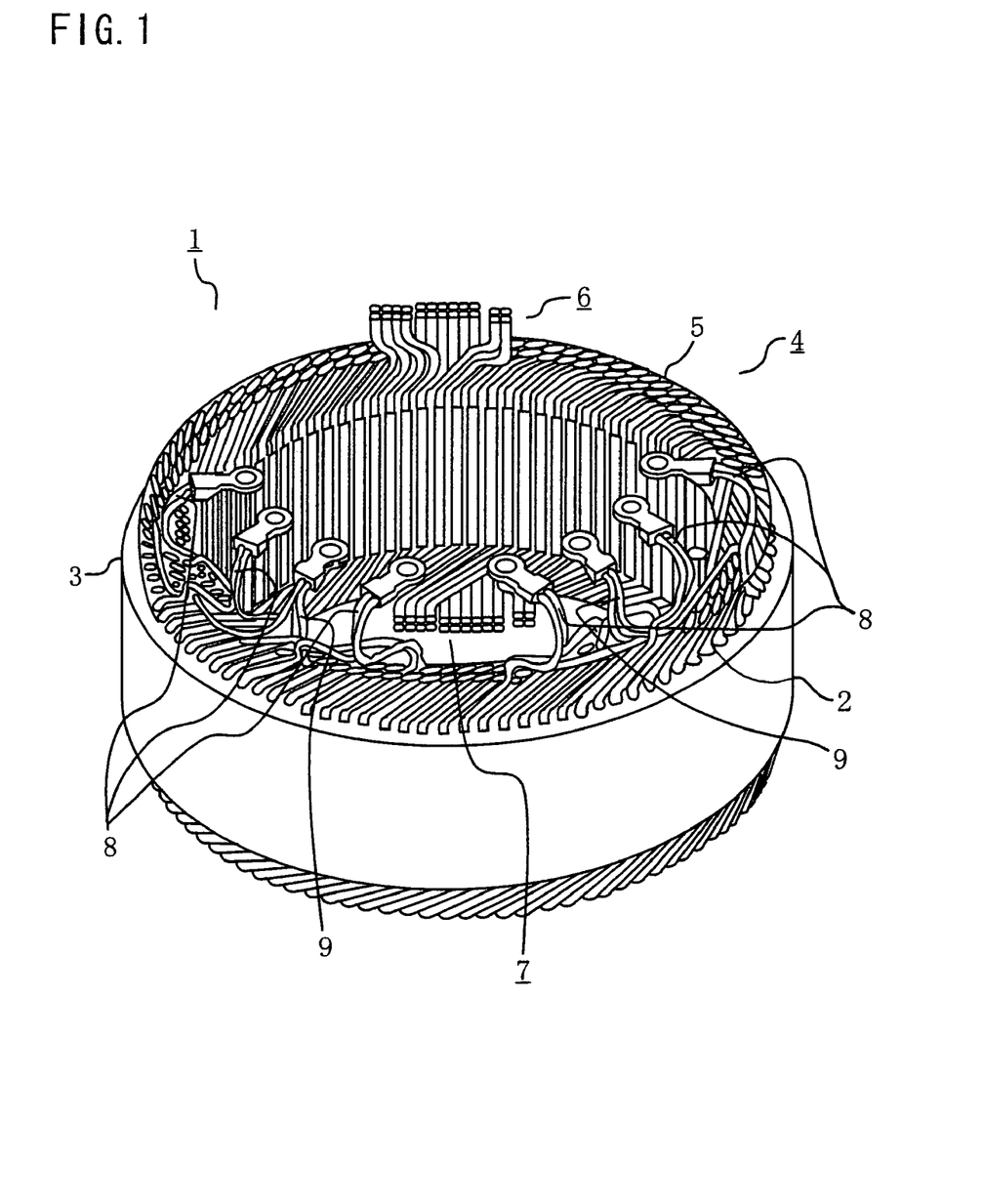
FIG. 1 is a perspective view of a stator of an AC generator according to a first embodiment of the invention.

FIG. 1 is a perspective view of a stator 1 of a rotating electric machine fabricated by a manufacturing method according to a first embodiment of the invention. The stator 1 of the rotating electric machine, which is used as an AC generator to be installed on a vehicle, includes a cylindrical stator core 3 with a plurality of slots 2 formed in a curved inner surface of the stator core 3 at regular intervals along a circumferential direction thereof, the slots 2 extending along an axial direction, and stator windings 4 wound in the stator core 3. The stator windings 4 are formed by arranging multiple line conductors 5 which are elongate strip conductors side by side, shaping the line conductors 5 in spiral form, and fitting the spiral-shaped line conductors 5 into the slots 2 in the stator core 3. End portions of the multiple line conductors 5 are shaped to configure formed terminal leads 6, 7 for connection to specific other conductors.

The stator windings 4 are made up of a pair of 3-phase AC windings each of which is configured by connecting three phase windings. Lead wires 8 of the individual phase windings and a lead wire 9 for connection to a neutral point of each 3-phase AC winding are bent such that the individual lead wires 8, 9 extend outward generally along the axial direction of the stator 1 at a coil end portion thereof.

The manufacturing method of the first embodiment for producing the stator 1 thus structured is described in detail referring to FIGS. 1, 2, 3, 4, 5A and 5B. The stator 1 is manufactured by arranging the multiple line conductors 5 side by side and shaping the same in spiral form to configure a flat-patterned winding assembly 11, fitting the winding assembly 11 in the multiple slots 2 formed in one side of a flat stator core plate 3A, and shaping the stator core plate 3A into cylindrical form together with the winding assembly 11 fitted in the slots 2.

Figure 2:
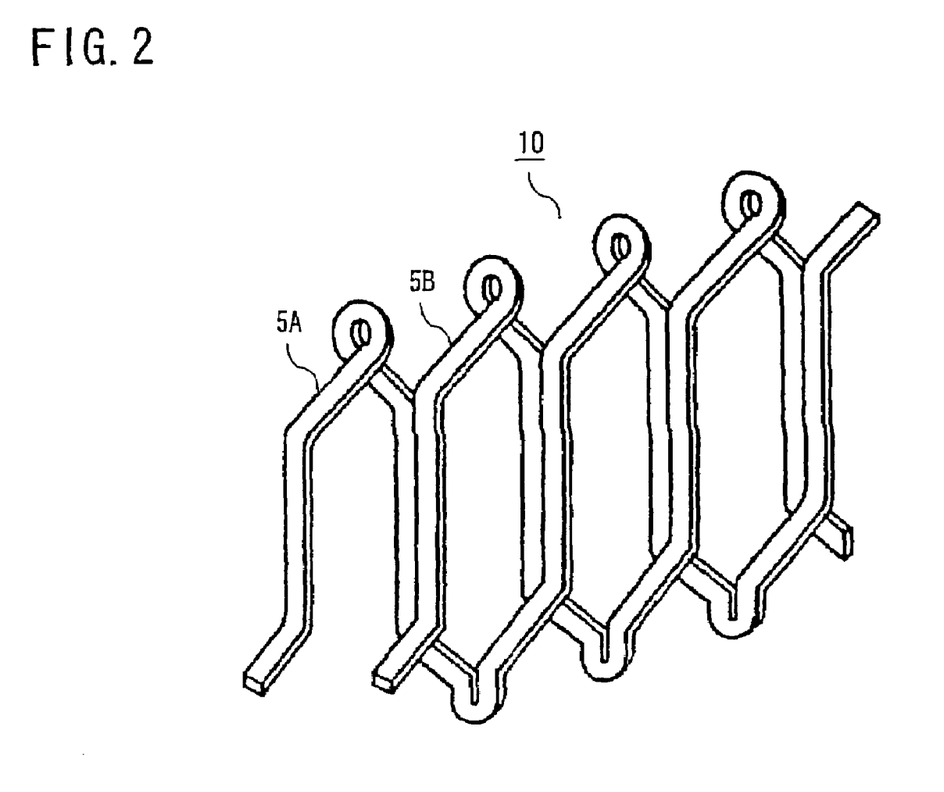
FIG. 2 is a diagram showing one of winding pairs used for configuring stator windings of the stator of FIG. 1.

The flat-patterned winding assembly 11 is formed by combining a plurality of winding pairs 10 shaped as shown in FIG. 2, for example. Each of the winding pairs 10 is made of a pair of spiral-shaped line conductors 5A, 5B, each having straight portions to be fitted in the slots 2 and end turns constituting coil end portions. As can be seen from the illustrated example, the straight portions of the line conductor 5A are alternately placed above and below the straight portions of the line conductor 5B such that the successive straight portions of each of the line conductors 5A, 5B would lie in an inner layer and an outer layer in alternate turns when fitted in the slots 2.

Figure 3:
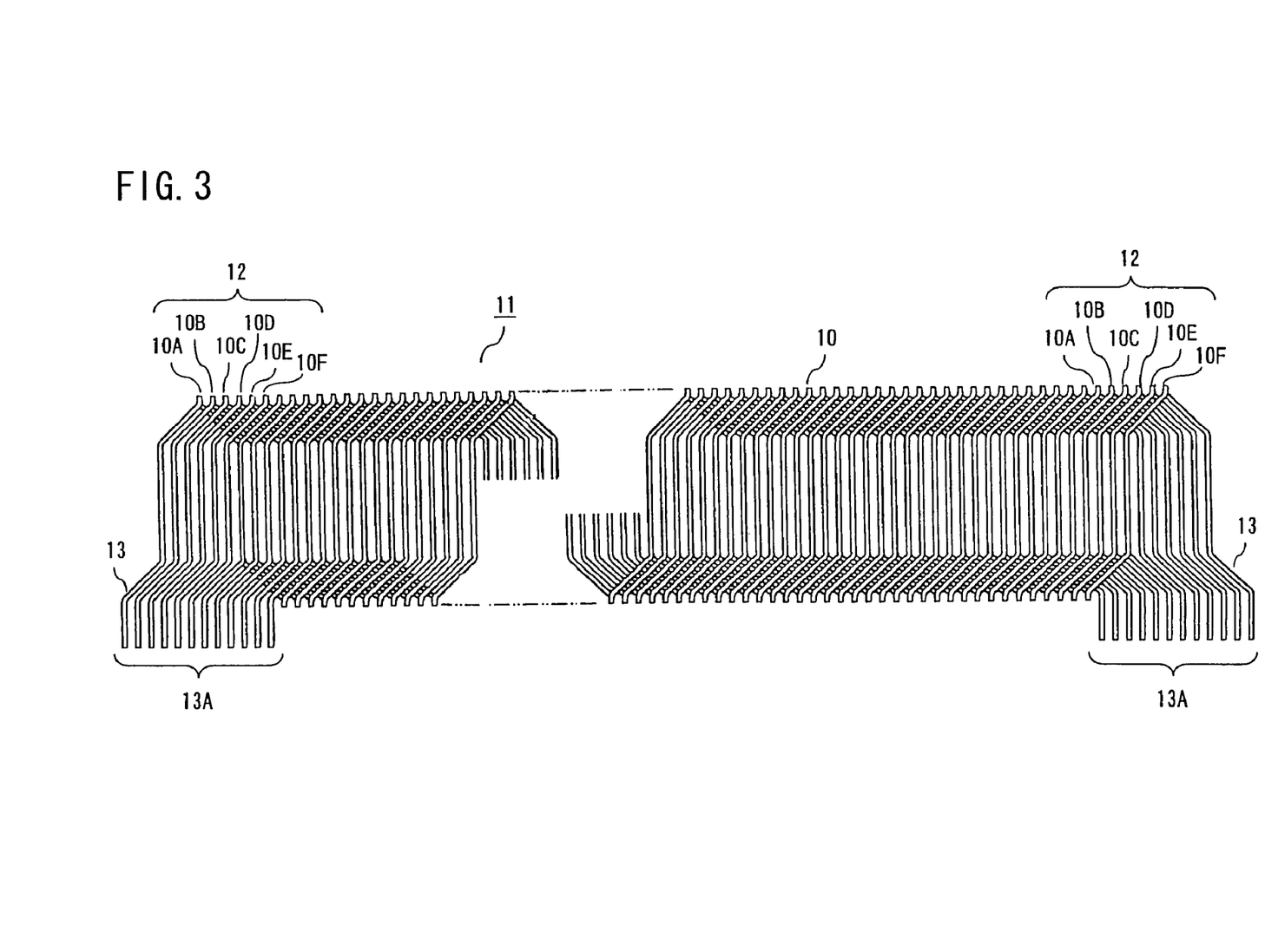
FIG. 3 is a diagram showing a flat-patterned winding assembly in one form of the first embodiment.

FIG. 3 shows how the flat-patterned winding assembly 11 is configured. In the present embodiment, the flat-patterned winding assembly 11 is formed of a winding group 12 made up of six winding pairs 10A, 10B, 10C, 10D, 10E, 10F.

In one form of the embodiment, the end portions of the individual line conductors 5 constituting lead wires 13 thereof are arranged such that the lead wires 13 would align parallel to one another at one end of a row of the slots 2 when fitted therein. Then, the lead wires 13 thus arranged are shaped into a specific form to make formed terminal leads 13A as illustrated (FIG. 3) by a conductor end shaping process which will be later described in detail.

Figure 4:
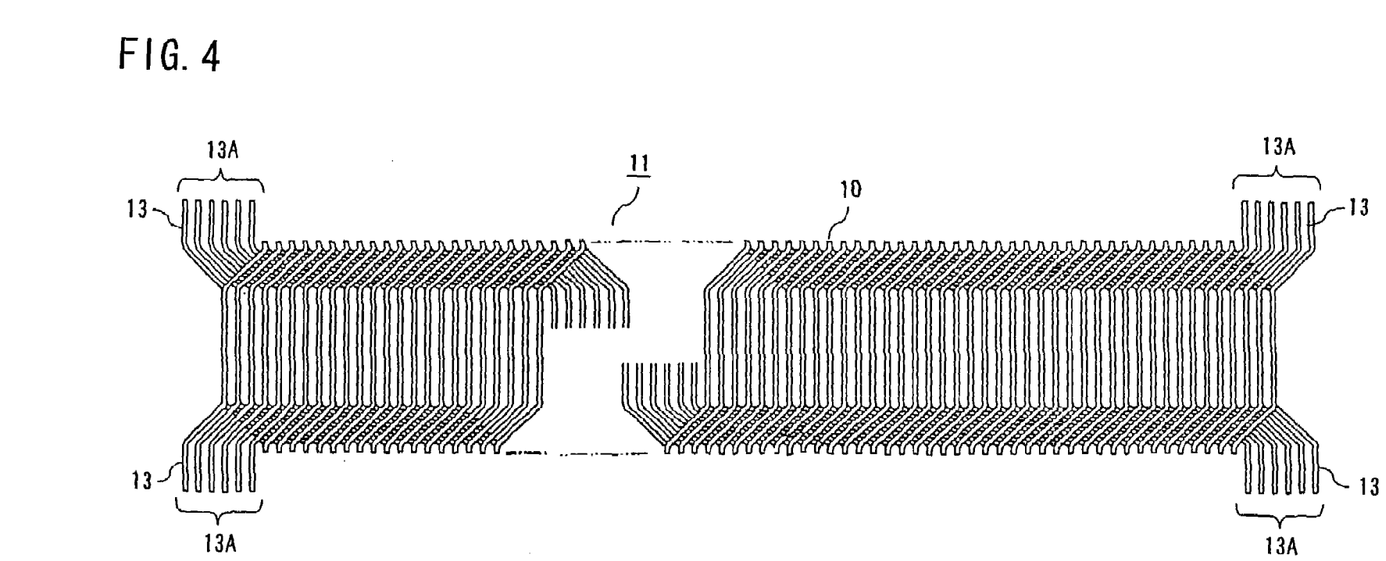
FIG. 4 is a diagram showing a flat-patterned winding assembly in another form of the first embodiment.

In another form of the embodiment, the flat-patterned winding assembly 11 is configured as shown in FIG. 4 so that the formed terminal leads 6, 7 would be located at both ends of the row of the slots 2 as illustrated in FIG. 1. In the flat-patterned winding assembly 11 thus configured, the end portions of the individual line conductors 5 constituting lead wires 13 thereof are arranged such that the lead wires 13 would align parallel to one another at one and the other ends of the row of the slots 2 when fitted therein. While the lead wires 13 thus arranged are also shaped into a specific form to make formed terminal leads 13A as illustrated (FIG. 4) by a similar conductor end shaping process, the lead wires 13 are divided into two groups extending in opposite directions and this facilitates the conductor end shaping process and subsequent wiring work.

In FIGS. 3 and 4, the lead wires 8 of the individual phase windings and the lead wire 9 for connection to the neutral point are not shown for simplicity of illustration.

Figures 5A, 5B:
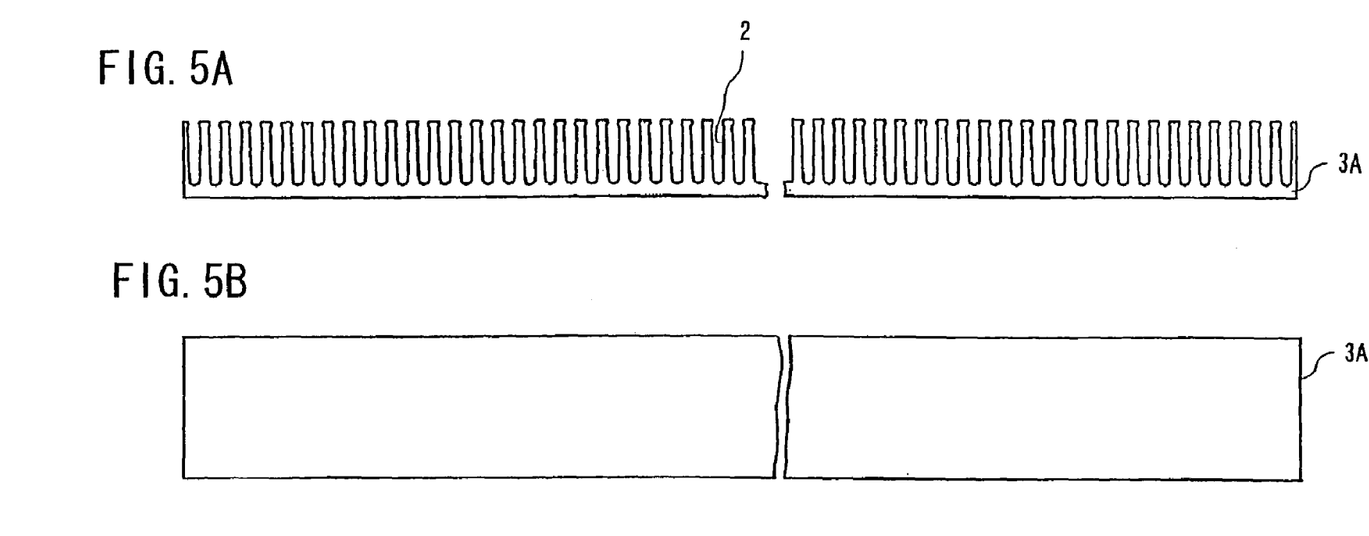
FIGS. 5A and 5B are a top view and a front view, respectively, showing a flat stator core plate which is formed into a stator core of the stator of FIG. 1.

FIGS. 5A and 5B are a top view and a front view, respectively, showing the flat stator core plate 3A which will be shaped into cylindrical form to configure the stator core 3 constituting part of the stator 1 shown in FIG. 1. As mentioned earlier, the multiple slots 2 are formed in one side of the stator core plate 3A at regular intervals.

Upon completion of the conductor end shaping process, the flat-patterned winding assembly 11 is fitted in the slots 2 formed in the flat stator core plate 3A shown in FIGS. 5A and 5B and, then, the flat stator core plate 3A is shaped into cylindrical form together with the winding assembly 11 fitted in the slots 2 to configure the stator 1 shown in FIG. 1.

The conductor end shaping process performed for shaping the lead wires 13 after configuring the flat-patterned winding assembly 11 is now described in greater detail.

Figure 6A:
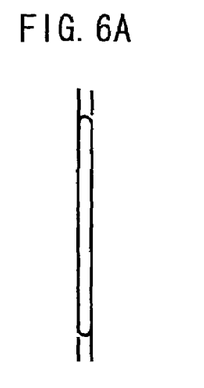
FIGS. 6A, 6B and 6C are diagrams showing a conductor end shaping process according to the first embodiment.
Figure 6B:
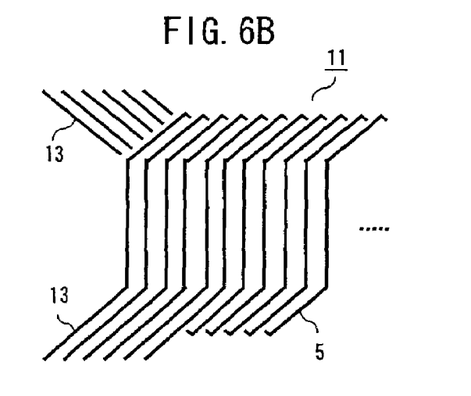
Figure 6C:
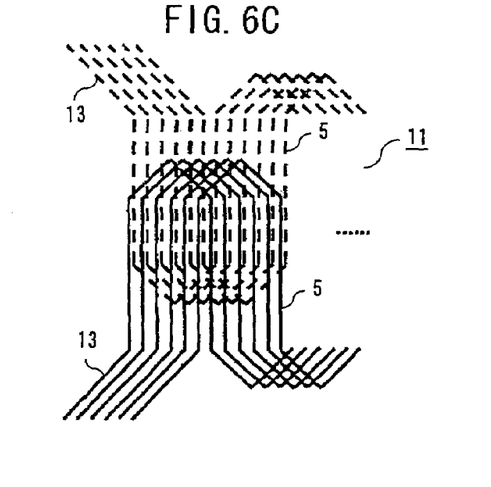

FIGS. 6A, 6B and 6C are diagrams showing the flat-patterned winding assembly 11 formed of the winding group 12 which is made up of the six winding pairs 10A, 10B, 10C, 10D, 10E, 10F. The following discussion reveals how the lead wires 13 extending downward from the winding assembly 11 are shaped.

Specifically, FIG. 6A is a side view of the winding assembly 11, FIG. 6B is a fragmentary front view of the winding assembly 11, and FIG. 6C is a fragmentary front view of the winding assembly 11 showing a state in which the line conductors 5 have been slid in a vertical direction from a position shown in FIG. 6B for shaping the lead wires 13. As illustrated in these Figures, the lead wires 13 which are the end portions of the multiple line conductors 5 are initially aligned side by side in a single plane (initial alignment plane). The present conductor end shaping process is for shaping the multiple lead wires 13 into the aforementioned specific form in the same plane as the initial alignment plane. This means that the lead wires 13 are shaped such that bent portions thereof do not make any angle with the initial alignment plane of the lead wires 13 in this conductor end shaping process.

As the individual line conductors 5 arranged side by side are not affixed to one another, the line conductors 5 are slid from a position shown in FIG. 6B to a position shown in FIG. 6C so that the lead wires 13 extending downward (as illustrated) and lower portions of the line conductors 5 of which lead wires 13 extend downward are more exposed.

Figure 7A:
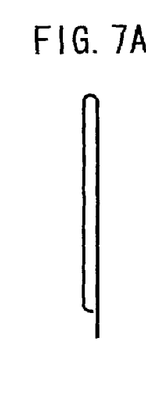
FIGS. 7A and 7B are diagrams illustrating the conductor end shaping process according to the first embodiment.
Figure 7B:
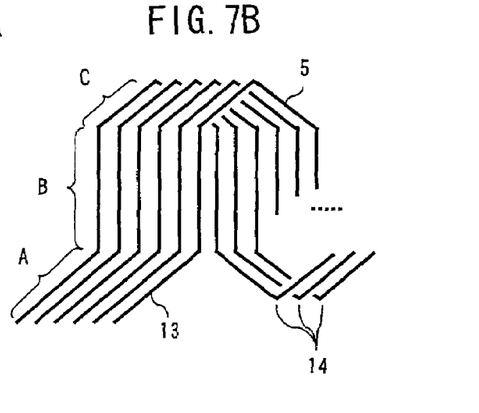

Although the lead wires 13 extending upward can also be shaped in the same fashion as the lead wires 13 extending downward, the conductor end shaping process is discussed here with reference to a configuration in which the lead wires 13 of the line conductors 5 extend only downward as illustrated in FIGS. 7A and 7B for the sake of simplicity of explanation.

Since the individual line conductors 5 arranged side by side are not affixed to one another as mentioned above, the end portion A (which constitutes the lead wire 13), straight portion B and end turn portion C of each line conductor 5 can be slightly separated from the corresponding portions of the adjacent line conductor 5 by bending each line conductor 5 using an apex 14 of the nearest lower end turn portion as a point of support, for instance. Accordingly, the multiple line conductors 5 which are closely arranged side by side with one another are deformed using the apex 14 of the lower end turn portion of each line conductor 5 nearest to the lead wire 13 thereof as a point of support in such a manner that the lead wires 13 (end portions A) of the individual line conductors 5 are slightly separated from one another along an X direction 16 (see FIG. 8B) which is generally perpendicular to the aforementioned initial alignment plane of the lead wires 13. Then, the multiple lead wires 13 are shaped into a specific bent form extending in a direction generally parallel to the initial alignment plane.

Described below is an example of a procedure for bending the lead wires 13 (end portions A) arranged parallel to one another after separating the same in a direction generally perpendicular to the initial alignment plane of the lead wires 13 with reference to FIGS. 8A, 8B and 8C.

Figure 8A:
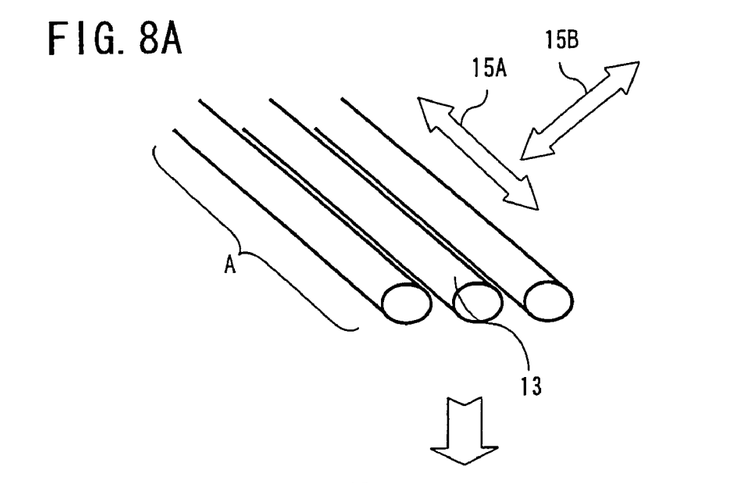
FIGS. 8A, 8B and 8C are diagrams illustrating the conductor end shaping process performed by using a stairstep conductor shaping jig according to the first embodiment.
Figure 8B:
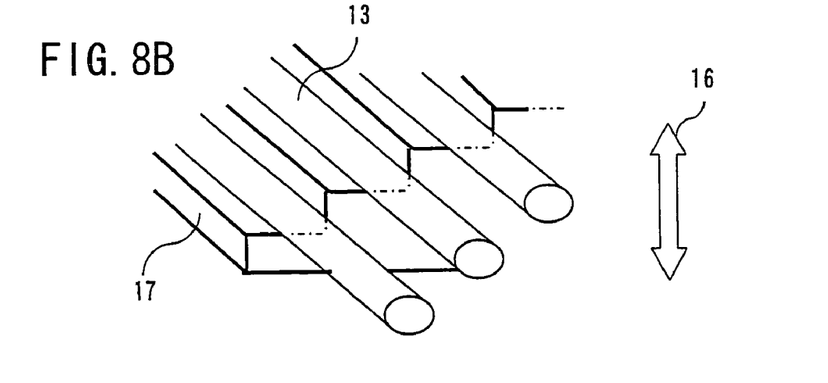

The multiple lead wires 13 which initially extend in a specific direction 15A and are aligned side by side in a transverse direction 15B as shown in FIG. 8A are individually supported by a lower stepped member 17 of a stairstep conductor shaping jig as shown in FIG. 8B. As a consequence, the lead wires 13 are separated from one another along the aforementioned X direction 16 which is generally perpendicular to the initial alignment plane of the lead wires 13 defined by the initially extending direction 15A of the lead wires 13 and the transverse direction 15B. In a state shown in FIG. 8B, those portions of the individual line conductors 5 which constitute a main part the winding assembly 11 are held aligned parallel to one another. Therefore, even if the lead wires 13 are separated from one another along the X direction 16 by deforming the line conductors 5 using the specific apex 14 of the lower end turn portion of each line conductor 5 as a point of support as mentioned above, the main part of the winding assembly 11 maintains an original shape thereof beyond that point of support 14. Additionally, because the adjacent lead wires 13 are separated from one another only along the X direction 16 by as much as the height of each stage (step) of the lower stepped member 17, the lead wires 13 are held in original relative locations in the transverse direction 15B and not deformed excessively.

Subsequently, the lead wires 13 supported by the lower stepped member 17 are bent by moving an upper punching member of the stairstep conductor shaping jig in the direction of an arrow 18 shown in FIG. 8C along the lower stepped member 17. Consequently, the multiple lead wires 13 are bent in the direction generally parallel to the initial alignment plane of the lead wires 13, and are thereby shaped into the desired form.

Figure 8C:
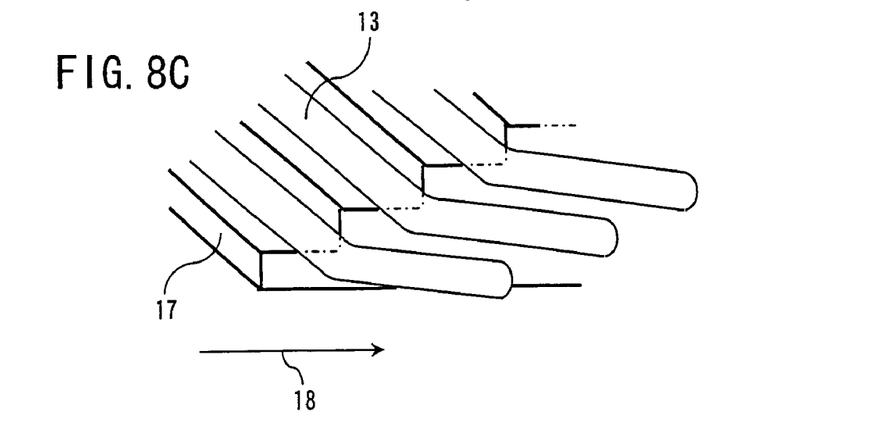
Figures 9A, 9B:
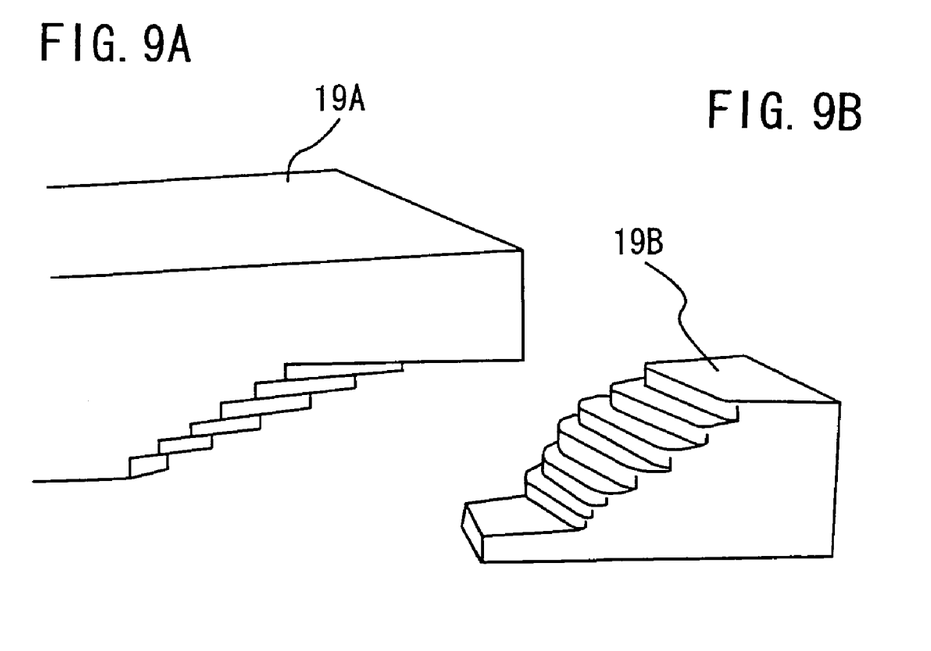
FIGS. 9A, 9B and 9C are diagrams showing a specific example of the stairstep conductor shaping jig used for performing the conductor end shaping process according to the first embodiment.
Figure 9C:
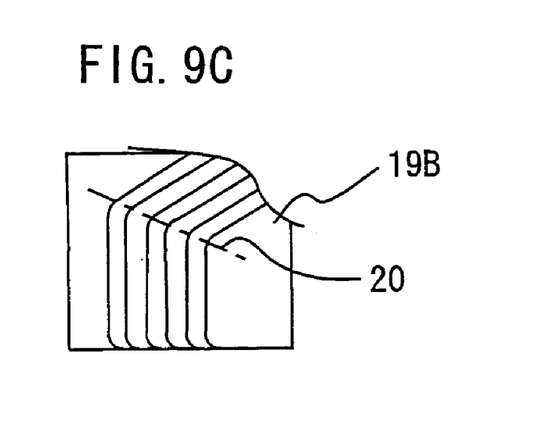

FIGS. 8A, 8B and 8C schematically illustrate the lower stepped member 17 of the stairstep conductor shaping jig to allow easy understanding of an example of the conductor end shaping process performed by arranging the multiple lead wires 13 in a in steplike fashion and shaping the same into the desired form. FIGS. 9A, 9B and 9C illustrate a more specific example of the structure of a stairstep conductor shaping jig 19, in which FIG. 9A is a perspective view of an upper stepped member 19A of the stairstep conductor shaping jig 19, FIG. 9B is a perspective view of a lower stepped member 19B, and FIG. 9C is a top view of the lower stepped member 19B. Designated by the numeral 20 in FIG. 9C is a line passing through corners of successive stages of the lower stepped member 19B for forming bent corners of the individual lead wires 13. The individual stages of the upper and lower stepped members 19A, 19B of the stairstep conductor shaping jig 19 have concave and convex corners, respectively, in plan view for shaping the lead wires 13 into the desired form. To minimize damage to any bent parts of the lead wires 13, edges of the stairstep conductor shaping jig 19 are mostly arc-shaped.

After the individual lead wires 13 have been shaped into the desired form under conditions where the lead wires 13 are slightly separated from one another along the X direction 16 which is generally perpendicular to the initial alignment plane of the lead wires 13 as discussed above, the multiple lead wires 13 are caused to return to positions in the initial alignment plane by just removing the upper and lower stepped members 19A, 19B of the stairstep conductor shaping jig 19. Since the lead wires 13 are separated from one another by just a small amount along the X direction 16, the lead wires 13 easily return to the positions in the initial alignment plane when the upper and lower stepped members 19A, 19B are removed.

In the present embodiment, the lead wires 13 are shaped into the aforementioned specific form before the flat-patterned winding assembly 11 formed by shaping the multiple line conductors 5 arranged side by side in spiral form is fitted into the slots 2 formed in the flat stator core plate 3A. This procedure makes it possible to provide adequate work space for shaping the lead wires 13, simplify the structure of the jig used for conductor end shaping, and achieve improved working efficiency and reliability. Additionally, because the lead wires 13 are shaped with the lower portions of the line conductors 5 broadly exposed as shown in FIG. 6C, the work space for shaping the lead wires 13 is further broadened. As thus far described, the lead wires 13 aligned in parallel lines are separated from one another along the X direction 16 which is generally perpendicular to the initial alignment plane of the lead wires 13, bent into the desired form, and then returned to the positions aligned in the initial alignment plane in the conductor end shaping process of the present embodiment.

If the multiple lead wires 13 are simultaneously bent in the plane in which the lead wires 13 aligned side by side initially extend from the flat-patterned winding assembly 11, the individual lead wires 13 will be damaged by mutual friction in the shaping process. According to the aforementioned conductor end shaping process of the embodiment, however, the lead wires 13 are slightly separated from one another along the X direction 16 which is generally perpendicular to the plane in which the lead wires 13 are initially aligned so that the lead wires 13 are not shaped, or bent, in a single plane. Since the lead wires 13 are bent under conditions where the lead wires 13 are separated from one another along the X direction 16, the lead wires 13 are protected from damage by mutual friction. This makes it possible to shape the multiple lead wires 13 all together into bent form with high reliability. It should be appreciated from the foregoing discussion that the conveniently aligned multiple lead wires 13 can be easily shaped into bent form in a short time with high reliability.

Furthermore, as the multiple lead wires 13 arranged in a steplike fashion are shaped into bent form by using the upper and lower stepped members 19A, 19B of the stairstep conductor shaping jig 19, the conductor end shaping process can be easily performed in a reliable fashion with the lead wires 13 separated from one another along the X direction 16 which is generally perpendicular to the plane in which the lead wires 13 are initially aligned without the need for any complicated jigs or complex work. Moreover, since the lead wires 13 are secrely held immediately before and after the conductor end shaping process by use of the upper and lower stepped members 19A, 19B, it is possible to prevent spring back behavior of the lead wires 13.

While the upper and lower stepped members 19A, 19B of the stairstep conductor shaping jig 19 have the successive stages formed of vertical surfaces as illustrated in FIGS. 9A, 9B and 9C, the stairstep conductor shaping jig need not necessarily be of a type having successive stages formed of exactly vertical surfaces.

Second Embodiment

While the stairstep conductor shaping jig 19 of the first embodiment is formed of one each upper and lower stepped members 19A, 19B, the upper stepped member 19A may be made up of a set of stepped segments.

Figure 10:
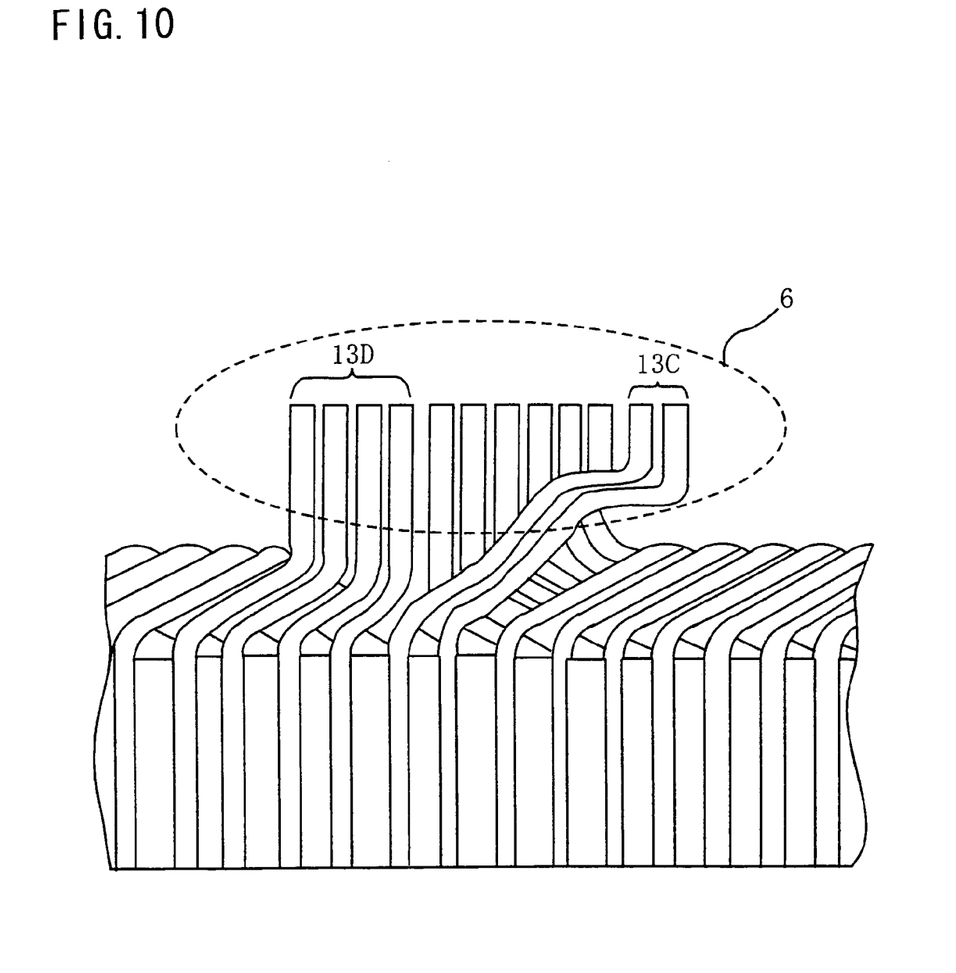
FIG. 10 is a diagram showing formed terminal leads of line conductors according to a second embodiment of the invention.

While six formed terminal leads 6 of the line conductors 5 are arranged side by side in a single layer in the first embodiment as shown in FIG. 1, formed terminal leads 6 of line conductors 5 are configured such that two formed terminal leads 13C are much separated from other four formed terminal leads 13D, for example, in a second embodiment of the invention as shown in FIG. 10. FIGS. 11A, 11B, 11C and 11D illustrate a stairstep conductor shaping jig 21 used in a conductor end shaping process according to the second embodiment of the invention. A stator 1 of the second embodiment is manufactured in the same way as in the first embodiment except that the stairstep conductor shaping jig 21 is used in the conductor end shaping process.

Figures 11A, 11B:
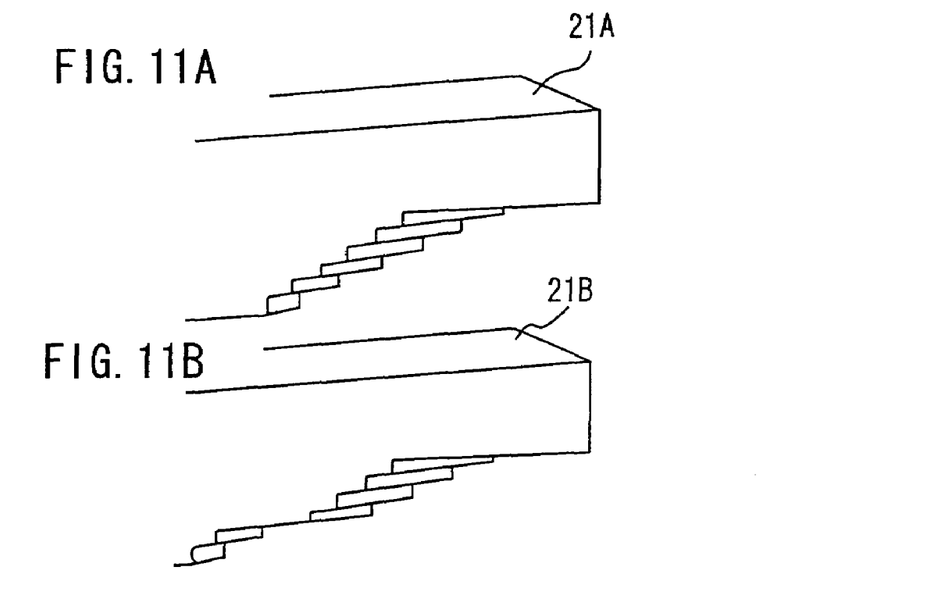
FIGS. 11A, 11B, 11C and 11D are diagrams showing a stairstep conductor shaping jig used in the second embodiment.
Figure 11C:
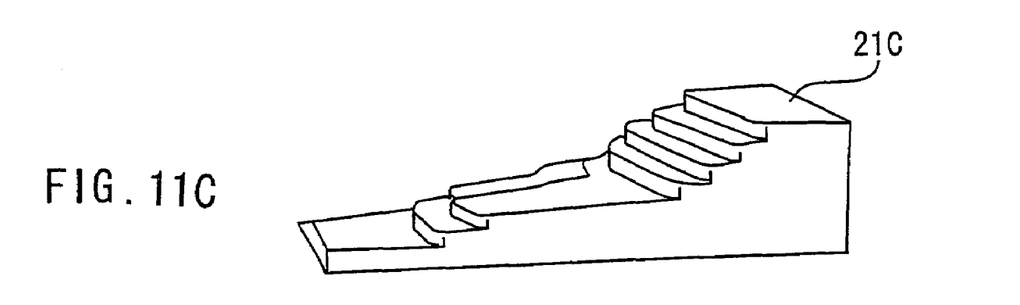
Figure 11D:
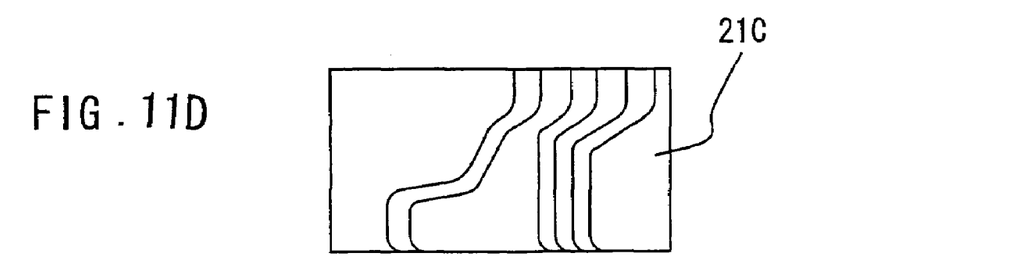

FIGS. 11A and 11B are perspective views of two upper stepped members 21A and 21B, respectively, FIG. 11C is a perspective view of a single lower stepped member 21C, and FIG. 11D is a top view of the lower stepped member 21C. The stepped members 21A, 21B, 21C are combined to form the stairstep conductor shaping jig 21 with the upper stepped member 21A positioned at the back and the upper stepped member 21B at the front as illustrated. In the conductor end shaping process of the second embodiment, a plurality of lead wires 13 aligned side by side are individually supported by the lower stepped member 21C in such a manner that the two formed terminal leads 13C will be much separated from the other four formed terminal leads 13D horizontally (as illustrated in FIG. 11C) and, at the same time, all the six lead wires 13 (13C, 13D) are separated from one another along an X direction 16 which is generally perpendicular to an initial alignment plane of the lead wires 13.

Subsequently, the lead wires 13 supported by the lower stepped member 21C are bent by moving the two upper stepped members 21A, 21B of the stairstep conductor shaping jig 21 along the lower stepped member 21C to produce the formed terminal leads 13C, 13D. Then, the multiple formed terminal leads 13C, 13D are caused to return to positions in the initial alignment plane of the lead wires 13 by just removing the stairstep conductor shaping jig 21 made up of the three stepped members 21A, 21B, 21C.

Since the lead wires 13 including formed terminal leads 13C, 13D are bent under conditions where the lead wires 13 are separated from one another along the X direction 16, the lead wires 13 are protected from damage by mutual friction in the second embodiment as well. This makes it possible to shape the multiple lead wires 13 all together into bent form with high reliability. It should be appreciated from the foregoing discussion that the conveniently arranged multiple lead wires 13 can be easily shaped into bent form in a short time with high reliability.

While the stairstep conductor shaping jig 21 includes the two upper stepped members 21A, 21B in the present embodiment, there may be provided more than two upper stepped members for performing the conductor end shaping process in a case where the lead wires 13 are to be shaped into more complicated form involving complex bending work and/or different lead wire shapes, although the number of steps of work process may increase.

Third Embodiment

While the foregoing first and second embodiments each employ the conductor end shaping process in which the multiple lead wires 13 are shaped into bent form under conditions where the lead wires 13 are separated from one another along the X direction 16, a third embodiment of the invention described hereunder with reference to FIGS. 12A, 12B, 13A, 13B, 14A, 14B, 15A and 15B employs a conductor end shaping process performed in a different way. A stator 1 of the third embodiment is manufactured in the same way as in the first embodiment except for the conductor end shaping process.

FIGS. 12A, 12B, 13A, 13B, 14A, 14B, 15A and 15B are fragmentary diagrams of a flat-patterned winding assembly 11 of the third embodiment, in which FIGS. 12A, 13A, 14A and 15A are side views, and FIGS. 12B, 13B, 14B and 15B are fragmentary front views.

Described below is how lead wires 13 of individual line conductors 5 extending downward from the winding assembly 11 are shaped. For the sake of simplicity, FIGS. 12A, 12B, 13A, 13B, 14A, 14B, 15A and 15B illustrate a configuration in which the lead wires 13 of the multiple line conductors 5 extend only downward.

As illustrated in these Figures, the lead wires 13 are aligned side by side in a single initially aligned side by side in a single plane (initial alignment plane). The present conductor end shaping process is for shaping the multiple lead wires 13 into the aforementioned specific form in the same plane as the initial alignment plane. This means that the lead wires 13 are shaped such that bent portions thereof do not make any angle with the initial alignment plane of the lead wires 13 in this conductor end shaping process.

Figures 12A, 12B:
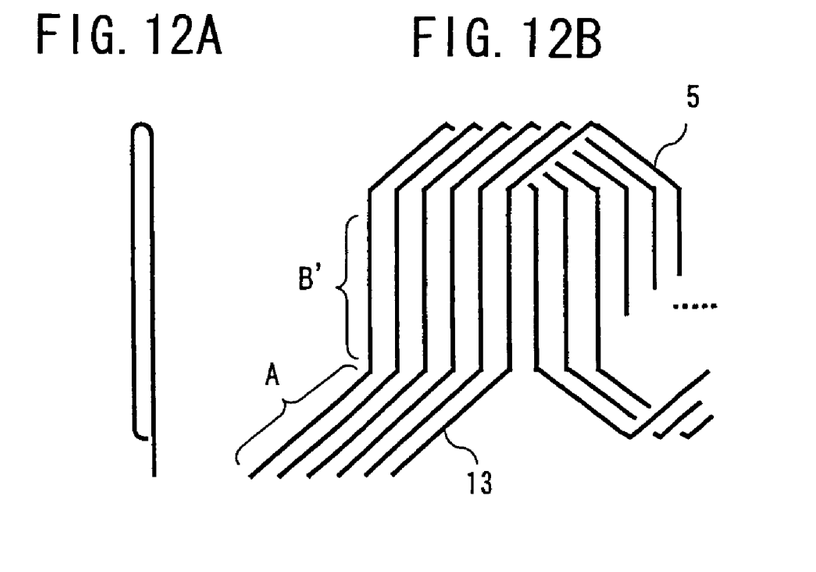
FIGS. 12A and 12B are diagrams showing a conductor end shaping process according to a third embodiment of the invention.
Figure 13A:
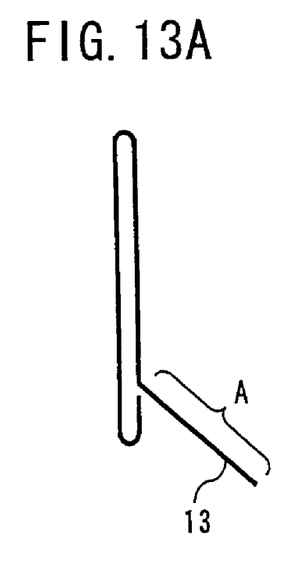
FIGS. 13A and 13B are diagrams further showing the conductor end shaping process according to the third embodiment.
Figure 13B:
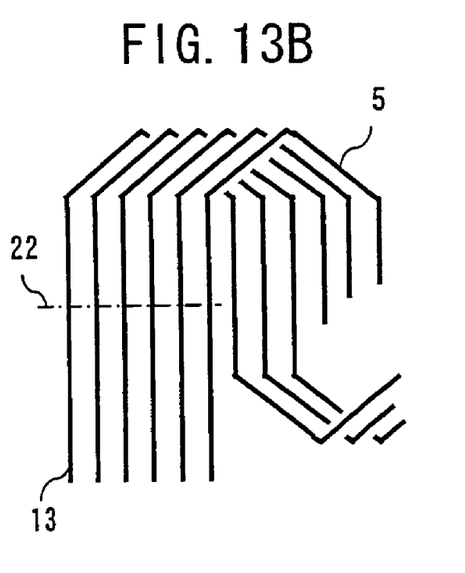
Figure 14A:
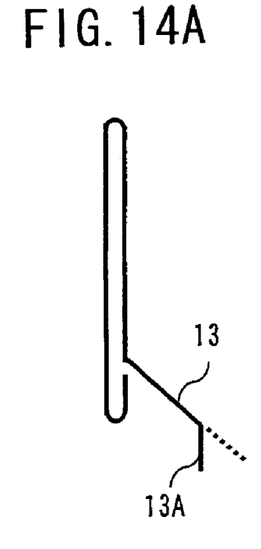
FIGS. 14A and 14B are diagrams further showing the conductor end shaping process according to the third embodiment.
Figure 14B:
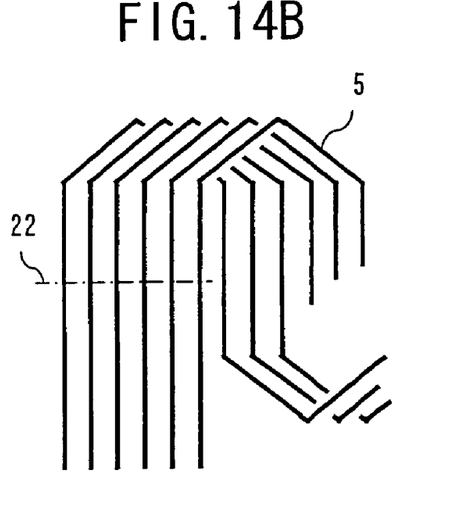

Referring to FIGS. 12A and 12B, straight portions of the parallel-aligned line conductors 5 that connect to end portions A thereof are conductor portions which will be fitted into slots 2 in a later process. Each of the multiple line conductors 5 is temporarily shaped into bent form with a twist at a temporary shaping starting point 22 chosen at a specific location within an extension of a straight portion B' excluding bent parts at both ends of the aforementioned straight portion as shown in FIGS. 13A and 13B. In this stage of the conductor end shaping process, the line conductors 5 are twisted while retaining an original bent form thereof (FIGS. 12B). As a result of this temporary shaping operation, the multiple lead wires 13 (end portions A) align side by side in straight lines, as if extending from the straight portions B' of the line conductors 5 as seen in the front view of FIG. 13B, in a plane which intersects the initial alignment plane of the lead wires 13 at a specific angle.

Subsequently, the multiple lead wires 13 which are parallel-aligned in the plane intersecting the initial alignment plane of the lead wires 13 as illustrated in FIGS. 13A and 13B are shaped from straight form (shown by a broken line in FIG. 14A) into a specific bent form (shown by a solid line in FIG. 14A) to configure formed terminal leads 13A by using a conductor shaping jig made up of upper and lower stepped members. Then, the multiple lead wires 13 temporarily shaped are caused to return to positions in the initial alignment plane of the lead wires 13 by untwisting action (spring back behavior) of the line conductors 5 about the respective temporary shaping starting points 22 as shown in FIGS. 15A and 15B.

Figure 15A:
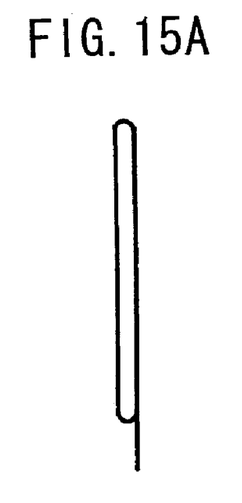
FIGS. 15A and 15B are diagrams further showing the conductor end shaping process according to the third embodiment.
Figure 15B:
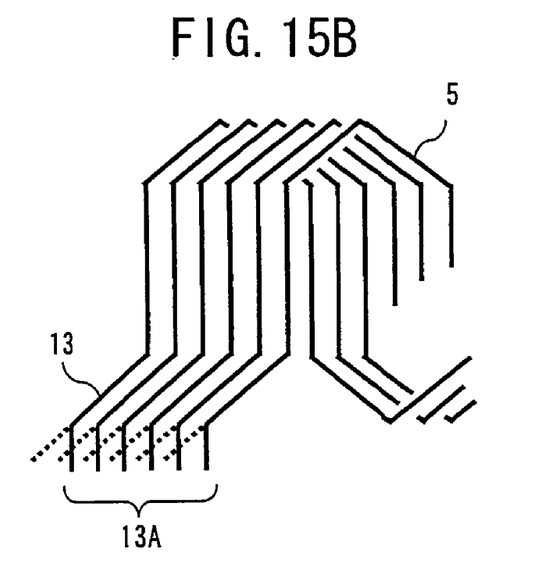

The aforementioned conductor end shaping process of the third embodiment includes the steps of temporarily shaping each of the multiple line conductors 5 by twisting the same at the temporary shaping starting point 22 chosen at the specific location within the extension of the straight portion B' that connects to the end portion A constituting the lead wire 13 (FIGS. 13A and 13B), shaping the multiple lead wires 13 which are parallel-aligned in the plane intersecting the initial alignment plane into the specific bent form (FIGS. 14A and 14B), and then causing the multiple lead wires 13 to return to the positions in the initial alignment plane by the untwisting action of the line conductors 5 about the respective temporary shaping starting points 22 (FIGS. 15A and 15B).

As previously mentioned, if the multiple lead wires 13 are simultaneously bent in the plane in which the lead wires 13 aligned side by side initially extend from the flat-patterned winding assembly 11, the individual lead wires 13 will be damaged by mutual friction in the shaping process. According to the aforementioned conductor end shaping process of the present embodiment, however, the lead wires 13 are temporarily aligned in a plane different from the initial alignment plane as shown in FIGS. 13A and 13B by twisting the individual lead wires 13 at the temporary shaping starting points 22 located upstream of the respective lead wires 13. Since the lead wires 13 are not bent within the plane in which the lead wires 13 are aligned side by side, the lead wires 13 are protected from damage by mutual friction. This makes it possible to shape the multiple lead wires 13 all together into bent form with high reliability. It should be appreciated from the foregoing discussion that the conveniently arranged multiple lead wires 13 can be easily shaped into bent form in a short time with high reliability. In addition, the conductor end shaping process can be performed by using a conductor shaping jig made up of simple stepped members.

While the invention has thus far been discussed as being applied to the manufacture of a generator stator in the foregoing first to third embodiments, the invention is also applicable to the manufacture of a rotor of a motor, yet producing the same advantage as described heretofore.

What is claimed is:

1. A method of manufacturing a stator of a rotating electric machine by aligning a plurality of strip line conductors side by side and shaping the line conductors in spiral form to configure a flat-patterned winding assembly, fitting the flat-patterned winding assembly into multiple slots formed in a flat stator core plate and shaping the stator core plate into cylindrical form together with the winding assembly fitted in the slots, in which said method includes a conductor end shaping process for shaping a plurality of lead wires which are end portions of the multiple line conductors aligned side by side in a single layer into a specific form in a plane in which the lead wires are initially aligned before fitting the flat-patterned winding assembly into the multiple slots, the conductor end shaping process comprising the steps of:

shaping the plurality of lead wires into bent form under conditions where the lead wires are separated from one another along a direction generally perpendicular to the plane in which the lead wires are initially aligned; and causing the plurality of lead wires to return to positions in the initial alignment plane of the lead wires.

2. The stator manufacturing method according to claim 1, wherein the plurality of lead wires are shaped into bent form under conditions where the lead wires are arranged in a step-like fashion by using a stairstep shaping jig.

3. The stator manufacturing method according to claim 2, wherein said shaping step comprises separating the lead wires from one another by a distance equal to a height of a step of the stairstep shaping jig.

4. The stator manufacturing method according to claim 2, wherein the lead wires are caused to return to said positions by removing the stairstep shaping jig.

* * * * *